Nov. 12, 1946.  R. BLACK, JR., ET AL  2,410,806
SUBMARINE SIGNAL DETECTOR
Filed Jan. 9, 1942

INVENTORS: R. BLACK, JR.
F. F. ROMANOW
BY
Robert J. Bluskey
ATTORNEY

Patented Nov. 12, 1946

2,410,806

UNITED STATES PATENT OFFICE 2,410,806

SUBMARINE SIGNAL DETECTOR

Robert Black, Jr., South Orange, and Frank F. Romanow, Berkeley Heights, N. J., assignors to Bell Telephone Laboratories, Incorporated, New York, N. Y., a corporation of New York Application January 9, 1942, Serial No. 426,130

3 Claims. (Cl. 181—0.5)

This invention relates to electromechanical transducers and, more particularly, to such devices for use in detecting signal waves or other disturbances in a liquid medium, specifically, water.

An object of the invention is to detect under water signal waves or other disturbances in a simple effective manner.

Another object is to protect the detecting means or unit from the water, without affecting the detecting properties of such means or unit and without requiring any complex pressure equalizing means because of the hydrostatic pressure head existing at the depth at which the detecting means might be submerged.

A feature of the invention comprises enclosing a known type of telephone receiver unit in a case or enclosure with its diaphragm opposite an aperture in a wall portion of the case and closing such aperture against water ingress with a flexible diaphragm.

Another feature comprises shaping such aperture so that it flares outwardly from the inside of the case, and employing rubber as the material of the flexible diaphragm.

In accordance with this invention, a known type of telephone receiver unit is mounted in a case having a flaring, or, specifically, frusto-conically shaped, aperture in one wall portion opposite which is located the diaphragm of the receiver unit. A relatively thick diaphragm of flexible material, preferably rubber, is clamped against and cemented to the water side of the case wall portion so as to overlie the aperture and seal the case interior against water ingress through the aperture. The receiver unit is so constructed and so spaced from the apertured wall portion that the fluid, for example, air, in the case, may flow, at a very low rate, between the front and back sides of the diaphragm of the unit. Connection between the terminals of the receiver unit and suitable indicating or recording electrical equipment at a point remote from the described device, is made through a cord or cable, which may also constitute the means to support the device in the water.

Other objects and features of the invention will be apparent, and a more complete understanding of the latter will be derived from the detailed description that follows, taken in conjunction with the appended drawing, wherein.

Figure 1:
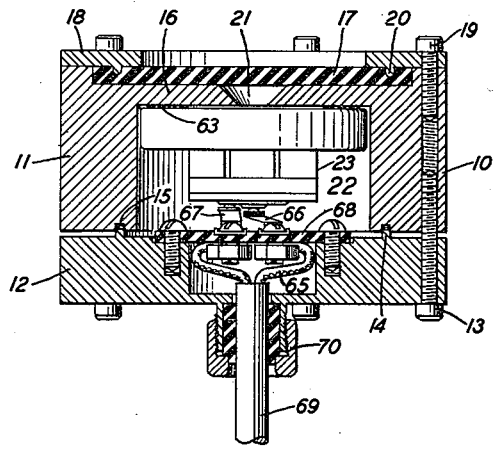
Fig. 1 is a cross-sectional view of a submarine signal detector or microphone embodying the invention.
Figure 2:
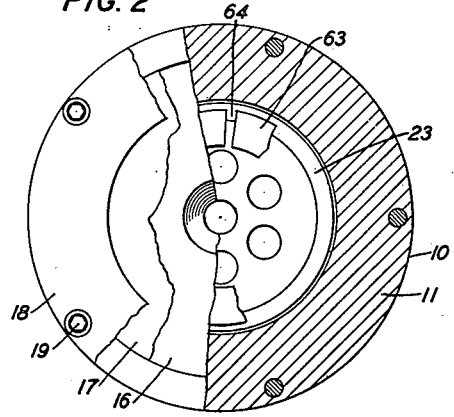
Fig. 2 is a top plan view of the device of Fig. 1 with successive portions broken away or in section to bring out details of construction.
Figure 5:
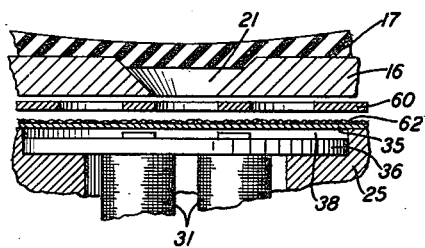
Fig. 5 is a cross-sectional view, enlarged, of a fragment of the device of Figs. 1–4 to show in greater detail the diaphragms of the device and the tensioned condition of the outer diaphragm.
Figure 3:
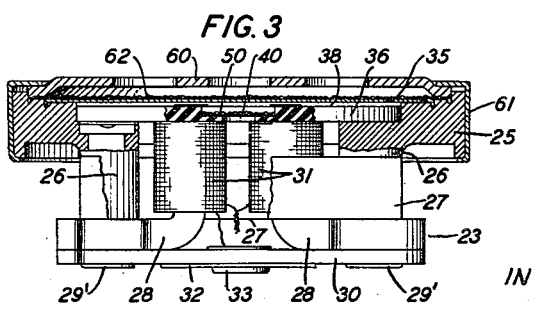
Fig. 3 is another view, enlarged, of the detector or microphone unit of the device of Fig. 1, partly in section and partly broken away.
Figure 4:
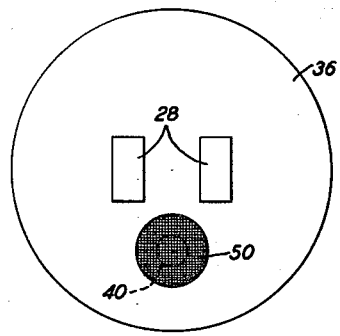
Fig. 4 is a top plan view of the insulator disc immediately under the diaphragm of the microphone unit.

The electromechanical transducer, submarine signal detector or microphone embodying the invention and shown in Figs. 1 to 5 comprises a heavy case or enclosure 10 of metal including a cylindrical cup-shaped portion 11 and a closure or cover plate or portion 12. These portions are secured together by a plurality of screws 13, a water-tight seal being provided by virtue of the annular ridge 14 on the plate fitting into the annular rubber-filled groove 15 in the portion 11. The base or planar wall portion 16 of the portion 11 is recessed on its outer surface to receive a circular insert or diaphragm 17 of flexible, elastic or resilient material, preferably soft rubber, cemented to the base 16 where adjacent thereto. An annular clamping member 18 is fastened to the case portion 11 by a plurality of screws 19, its inner portion overlapping the marginal area of the diaphragm 17 and having an annular ridge 20 protruding into the rubber insert. The base 16 contains an aperture or passage 21 of substantially frusto-conical shape, having its smaller base at the inner surface and its larger base at the outer surface of the case portion 11.

The fluid chamber 22 contains a telephone receiver unit 23 of a type manufactured by the Western Electric Company. This unit 23 embodies the magnetic circuit, acoustical network and electroacoustical circuit such as is incorporated in the receiver unit shown in Figs. 1 to 5 of L. A. Morrison et al. Patent 2,220,942 of November 12, 1940, but differs from the latter receiver unit principally in the character of the protector plate in front of the diaphragm and in the means for securing the protector plate to the receiver unit frame.

Specifically, the unit 23 comprises a cast metal frame 25 having a pair of projections or bosses 26 to which are secured by rivets 29' L-shaped pole-pieces 28 and an insulator terminal plate or disc 30. Windings or coils 31 encircle the vertical legs of the pole-pieces, and are connected in series between the concentric spaced terminals 32, 33. A pair of bar permanent magnets 27 are welded to and extend between the horizontal legs of the pole-pieces. An insulator plate or disc 36 contains a pair of appropriately shaped openings for the upper ends of the pole-pieces, and, also, an aperture or passage 40 over which is laid one or more strips of silk fabric 50. The diaphragm 35 forms a shallow air chamber 38 with the plate 36, and is supported at its peripheral portion by the frame 25, the diaphragm being held in position by magnetic attraction under the influence of the permanent magnet flux. The diaphragm protector plate is a multiaperture sheet metal stamping 60 secured to the frame at its edge by the spun-over metallic annulus 61. A moisture-proofing diaphragm 62 of oiled silk may be interposed between the diaphragm 35 and the protector plate. The structure on the underside of the plate 36 is so proportioned and arranged that the chambers 22 and 38 are interconnected through the passage 40.

The unit 23 makes a loose fit with the cylindrical inner surface of the case portion 11, with its diaphragm 35 disposed opposite the small base of the aperture 21. A thin split ring washer 63 is interposed between the unit 23 and the base 16, the gap 64 providing an air passage for slow air leak between the front and rear sides of the diaphragm 35. Electrical connection of the unit 23 with indicating or recording electrical equipment at a remote point, is made through cord or cable 69 containing conductors 65 terminated at spring terminals 66, 67 carried by insulator plate 68 and engaging with the terminals 32, 33 of the unit. The gland 70 provides a water-tight seal around, and also acts as a strain reliever for the cable.

When the device of Figs. 1 to 4 is submerged in water the hydrostatic pressure head acting on the rubber diaphragm 17 will increase as the depth of submersion is increased. Under the increased force, the rubber diaphragm will tend to be forced into the aperture 21. Because of the flaring wall contour of the latter, even a very great pressure will do no more than cause the central portion of diaphragm 17 to assume the general position indicated in enlarged detail in Fig. 5. This will be a small-area stretched diaphragm coupled to the diaphragm of the receiver unit through the air space or chamber between. Obviously, the volume change in front of the diaphragm 35 because of the displacement of diaphragm 17 is small, and, with the presence of the pressure equalizing leak 64, does not result in any pressure unbalance or non-equalization developing with respect to the diaphragm 35. The stiffness of the portion of the diaphragm 17 overlying the aperture is increased as a result of its deformation and its radiation mass is reduced.

An underwater signal wave or other disturbance incident on the portion of diaphragm 17 overlying the aperture 21, is transferred to the diaphragm 35 through the air space between the two diaphragms. The vibration of diaphragm 35 in response thereto varies the reluctance of the magnetic circuit of the receiver unit, and the resultant changes in flux in the pole-pieces induce in the coils 31 currents corresponding to such flux changes. These currents are led over the conductors of the cable to suitable indicating or recording electrical equipment (not shown).

In a device constructed in accordance with this invention, the diaphragm 17 was about 2.5 inches in diameter and about .125 inch in thickness; wall portion 16 was about $\frac{3}{32}$ inch in thickness; the large base of the aperture 21 was about .5 inch in diameter and its small base about .25 inch in diameter, the aperture being centrally located in the base 16. The distance between the inner surface of diaphragm 17 and the outer surface of diaphragm 35, with the device out of the water, was of the order of .25 inch. The device responded effectively to vibrations over a band of frequencies from about 200 cycles per second to about 4000 cycles per second. Fig. 1 shows approximately the relative proportions of the components of the device.

The term transducer refers to a device absorbing power from one system and supplying power to another system or systems. These systems may be electrical, mechanical or acoustical.

Although this invention has been disclosed with reference to a specific embodiment, it will be apparent that it is not limited thereto, but is of a scope evidenced by the appended claims.

What is claimed is:

1. A submarine signal detector comprising a water-tight fluid-containing enclosure, having a wall portion with an aperture that flares outwardly between inner and outer surfaces of the wall portion, a flexible rubber diaphragm contiguous with and fastened against said outer surface to prevent water entering said enclosure through said aperture, and a diaphragm within said enclosure spaced from said inner surface and arranged so that fluid within the enclosure may flow between opposite sides of the diaphragm.

2. A signaling device for use in a liquid medium, comprising a hollow container having an aperture in one wall, a diaphragm of elastic material on the outside of said container and overlying said aperture, said diaphragm under pressure of the liquid medium being adapted to be forced partially into said aperture and thereby tensioned; a unitary assembly within said container and including a diaphragm and a plate forming a shallow air chamber with one side of the diaphragm, said plate containing an aperture connecting said air chamber with the remaining space in the container, the other side of the diaphragm being disposed opposite to the aperture in the container wall portion; and spacer means between the unitary assembly and said wall portion, containing a restricted air passage connecting the space between the unitary assembly and said wall portion with the remaining space in the container.

3. A transducer for use in a liquid medium comprising a fluid-containing enclosure excluding the liquid medium and having a wall portion with an aperture therein that flares outwardly between inner and outer surfaces of the wall portion, a diaphragm of elastic material contiguous with and fastened against said outer surface to prevent entrance of the liquid medium into said enclosure through said aperture, the portion of said diaphragm overlying said aperture being forced into said aperture by the liquid medium whereby said diaphragm portion is tensioned, and a second diaphragm, said second diaphragm being within said enclosure and spaced from said inner surface.

ROBERT BLACK, Jr.
FRANK F. ROMANOW.